United States Patent
Karri et al.

(10) Patent No.: US 12,046,252 B2
(45) Date of Patent: Jul. 23, 2024

(54) DIRECTIONAL VOICE COMMAND IDENTIFICATION

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Annyasha Lahiri, Ukkunagram (IN)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 17/114,612

(22) Filed: Dec. 8, 2020

(65) Prior Publication Data
US 2022/0180888 A1   Jun. 9, 2022

(51) Int. Cl.
| | | |
|---|---|---|
| G10L 15/22 | (2006.01) | |
| G06T 19/00 | (2011.01) | |
| G10L 15/18 | (2013.01) | |
| G10L 21/0216 | (2013.01) | |
| G10L 21/0272 | (2013.01) | |

(52) U.S. Cl.
CPC ........ G10L 21/0216 (2013.01); G06T 19/006 (2013.01); G10L 15/1815 (2013.01); *G10L 2015/228* (2013.01)

(58) Field of Classification Search
CPC ............ G10L 21/0216; G10L 15/1815; G10L 2015/228; G06T 19/006
See application file for complete search history.

(56) References Cited

U.S. PATENT DOCUMENTS

| | | | | |
|---|---|---|---|---|
| 5,999,208 A | * | 12/1999 | McNerney | ............... H04N 7/15 348/E7.083 |
| 10,540,976 B2 | | 1/2020 | Van Os | |
| 10,646,767 B2 | * | 5/2020 | Kudirka | ............. G02B 27/0101 |

(Continued)

FOREIGN PATENT DOCUMENTS

DE   102017117569 A1   2/2019

OTHER PUBLICATIONS

Martin, Taylor, "How to string multiple Alexa commands together", Mar. 9, 2018, 2 pages, <https://www.cnet.com/how-to/how-to-string-multiple-alexa-commands-together/>.

*Primary Examiner* — Olujimi A Adesanya
(74) *Attorney, Agent, or Firm* — Monchai Chuaychoo

(57) ABSTRACT

Embodiments of the present invention provide a computer system a computer program product, and a method that comprises analyzing a received directional voice command by identifying a plurality of contextual factors associated with at least one user in a plurality of users using a natural language processing algorithm; dynamically identifying the at least one user in the plurality of users based on an analysis of the identified contextual factors associated with the received directional voice command; generating a plurality of scenarios within a mixed reality environment based on the analysis of the identified contextual factors associated with received directional voice command; identifying a location associated with at least one received directional voice command within a plurality of directional voice commands; and validating the location associated with the at least one received directional voice command using a corpus knowledge algorithm.

20 Claims, 3 Drawing Sheets

(56) References Cited

U.S. PATENT DOCUMENTS

| | | | |
|---|---|---|---|
| 10,715,528 B1* | 7/2020 | Leblang | H04W 4/02 |
| 2010/0312547 A1* | 12/2010 | Van Os | G06F 3/167 |
| | | | 704/E15.04 |
| 2012/0327115 A1* | 12/2012 | Chhetri | H04R 3/005 |
| | | | 345/633 |
| 2013/0342571 A1* | 12/2013 | Kinnebrew | G06F 3/147 |
| | | | 345/633 |
| 2016/0026253 A1* | 1/2016 | Bradski | H04N 13/128 |
| | | | 345/8 |
| 2017/0357637 A1 | 12/2017 | Nell | |
| 2017/0365102 A1* | 12/2017 | Huston | G06T 15/205 |
| 2018/0004481 A1* | 1/2018 | Fallon | G06F 3/04815 |
| 2018/0139565 A1* | 5/2018 | Norris | H04S 1/007 |
| 2018/0307303 A1* | 10/2018 | Powderly | G02B 27/017 |
| 2018/0336732 A1* | 11/2018 | Schuster | G06T 19/006 |
| 2018/0366118 A1* | 12/2018 | Lovitt | G10L 15/22 |
| 2019/0005724 A1* | 1/2019 | Pahud | G06F 3/011 |
| 2019/0215628 A1* | 7/2019 | Norris | H04M 1/72457 |
| 2019/0342693 A1* | 11/2019 | Norris | H04S 7/304 |
| 2019/0362557 A1* | 11/2019 | Lacey | G06T 5/20 |
| 2020/0035244 A1 | 1/2020 | Kim | |
| 2020/0143597 A1* | 5/2020 | Lyren | G06F 3/012 |
| 2020/0219501 A1* | 7/2020 | Cartwright | G06F 3/0346 |
| 2020/0368616 A1* | 11/2020 | Delamont | G06F 3/011 |
| 2021/0097776 A1* | 4/2021 | Faulkner | G06V 40/113 |

* cited by examiner

DIRECTIONAL VOICE COMMAND IDENTIFICATION

BACKGROUND

The present invention relates generally to the field of voice command system technologies, and more specifically artificial intelligence voice assistance system technologies.

A microphone is a device that converts sounds into an electrical signal. Microphones are used in many applications such as telephones, hearing aids, public address systems for concert halls and public events, motion picture production, live and recorded audio engineering, sound recording, two-way radios, megaphones, radio and television broadcasting. They are also used in computers for recording voice, speech recognition, and for non-acoustic purposes such as ultrasonic sensors or knock sensors. Several types of microphone are used today, which employ different methods to convert the air pressure variations of a sound wave to an electrical signal. The most common are a dynamic microphone, which uses a coil of wire suspended in a magnetic field; the condenser microphone, which uses a vibrating diaphragm as a capacitor plate; and the contact microphone, which uses a crystal of piezoelectric material. Microphones typically need to be connected to a preamplifier before the signal can be recorded or reproduced.

A loudspeaker is an electroacoustic transducer; a device which converts an electric audio signal into a corresponding sound. The most widely used type of speaker is the dynamic speaker. The sound source (e.g., a sound recording or a microphone) must be amplified or strengthened with an audio power amplifier before the signal is sent to the speaker. The dynamic speaker operates on the same basic principle as a dynamic microphone, but in reverse, to produce sound from an electric signal. When an alternating current electrical audio signal is applied to its voice coil, a coil of wire suspended in a circular gap between the poles of a permanent magnet, the coil is forced to move rapidly back and forth due to Faraday's law of induction, which causes a diaphragm (usually conically shaped) attached to the coil to move back and forth, pushing on the air to create sound waves. Besides this most common method, there are several alternative technologies that can be used to convert an electrical signal into sound. Speakers are typically housed in a speaker enclosure, and this enclosure's materials and design play an important role in the quality of the sound. The enclosure generally must be as stiff and non-resonant as practically possible. Smaller loudspeakers are found in devices such as radios, televisions, portable audio players, computers, and electronic musical instruments.

SUMMARY

Embodiments of the present invention provide a computer system, a computer program product, and a method that comprises analyzing a received directional voice command by identifying a plurality of contextual factors associated with at least one user in a plurality of users using a natural language processing algorithm; dynamically identifying the at least one user in the plurality of users based on an analysis of the identified contextual factors associated with the received directional voice command; generating a plurality of scenarios within a mixed reality environment based on the analysis of the identified contextual factors associated with received directional voice command; identifying a location associated with at least one received directional voice command within a plurality of directional voice commands; and validating the location associated with the at least one received directional voice command using a corpus knowledge algorithm.

DETAILED DESCRIPTION

Embodiments of the present invention recognize the need for an improvement to current voice recognition technology systems that are initiated by a wake-up command and authenticated by a single user associated with a voice recognition device. Currently, voice recognition technology systems require a user known by the device to submit an initiation command followed by a voice command, where the voice command can be an execution of a task or a search request. Generally, voice recognition technology systems do not communicate with voice recognition technology systems associated with other users that are not known. Furthermore, current voice recognition technology systems authenticate an identify of a single user based on a voice identification at a given time. Embodiments of the present invention improve these voice recognition technology systems by allowing a user to transmit voice commands without the need for a wake-up command, dynamically authenticating identities of multiple users based on voice identification of known and unknown users by storing voice identifications of known users and querying voice identifications of unknown users within a voice database of possible users within a virtual reality ("VR") environment, and identifying directional voice commands within a plurality of generated mixed reality environments. Embodiments of the present invention provide these improvements to the voice identification technology systems that allow multiple artificial intelligence devices to communicate with each other without the need of user input by analyzing a directional voice command and defining individual security based on context of voice command, time or event-based permission time of voice command, and location-based permission of voice command. Embodiments of the present invention increase the efficiency of the communication between multiple artificial intelligence devices by receiving a voice command, analyzing the received voice command for a requested factor using an artificial intelligence voice assistance algorithm, dynamically identifying an appropriate user associated with the requested factor within a database of multiple users, transmitting the requested factor to the identified appropriate user, and allowing communication between multiple users associated with the requested factor. Embodiments of the present invention provide an improvement by generating a scenario associated with an activity within a mixed reality environment based on a directional voice command.

Figure 1:
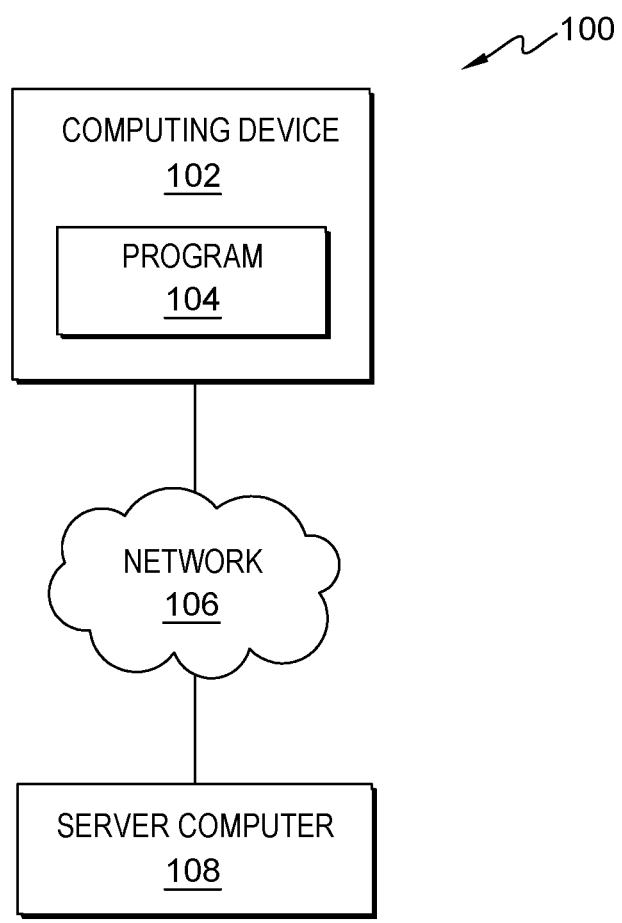
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computer 108. The computing device 102 and the server computer 108 may be desktop computers, laptop computers, specialized computer servers, smart phones, wearable technology, or any other computing devices known in the art. In certain embodiments, the computing device 102 and the server computer 108 may represent computing devices utilizing multiple computers or components to act as a single pool of seamless resources when accessed through a network 106. Generally, the computing device 102 and the server computer 108 may be representative of any electronic devices, or a combination of electronic devices, capable of executing machine-readable program instructions, as described in greater detail with regard to FIG. 3.

The computing device 102 may include a program 104. The program 104 may be a stand-alone program 104 on the computing device. In another embodiment, the program 104 may be stored on a server computer 108. In this embodiment, the program 104 improves the capabilities of voice recognition technology by identifying and analyzing a context of a directional voice command within a generated mixed reality environment by providing contextual information for a user in response to receiving request permission from the user associated with that particular artificial intelligence device; determining an amount of access given to a different artificial intelligence device in response to authenticating the first artificial intelligence device or the different artificial intelligence device; generating a plurality of mixed reality environments with generated individuals within the mixed reality environments for an analysis of simulated directional voice commands. In this embodiment, the program 104 receives data from at least one user, and the received data is a directional voice command. In this embodiment, the program 104 analyzes the received data for a factor associated with a request within the directional voice command using an artificial intelligence voice assistance algorithm. In this embodiment and in response to generating a mixed reality environment, the program 104 generates a scenario associated with an activity based on the received voice command within a mixed reality environment. In this embodiment, the program 104 generates the scenario by identifying a deviation (i.e., delta) within the received voice command, comparing the deviation to a known knowledge corpus associated with the received voice command, and verifying the failure and success of the deviation via testing algorithms. In another embodiment, the program 104 opens a line of communication between the multiple computing devices 102 associated with the multiple users associated with the identified request factor. For example and in response to user A executing a voice command to clean a spill, the program 104 generates a scenario using a plurality of virtual individuals requesting assistance to clean multiple spills and program 104 identifies the location of each virtual individual based on the verification of each directional voice command.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computer 108, specifically the program 104 in accordance with a desired embodiment of the invention.

The server computer 108 communicates with the computing device 102 via the network 106. In this embodiment, the server computer 108 stores a result of a test of the program 104 (not shown). In another embodiment, the server computer 108 may include the program 104.

Figure 2:
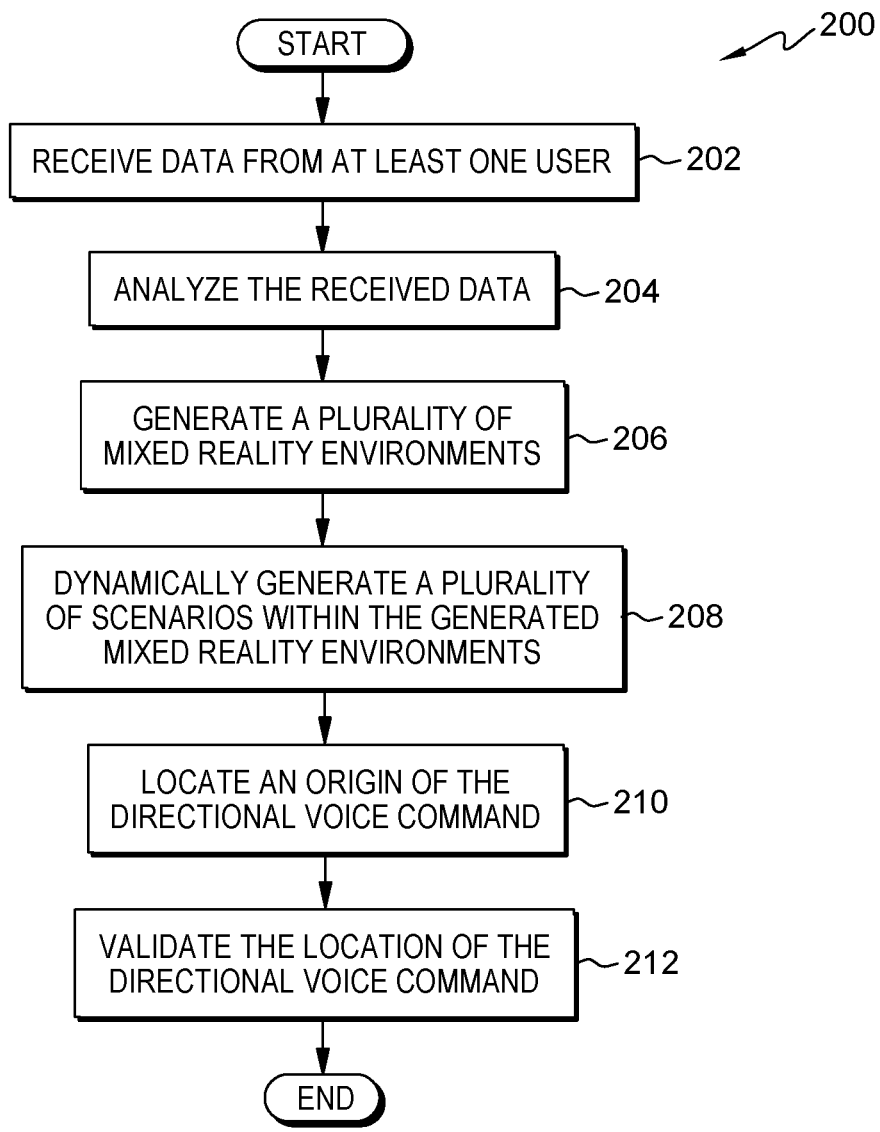
FIG. 2 is a flowchart illustrating operational steps for dynamically validating a directional voice command based on a generated scenario within a mixed reality environment, in accordance with at least one embodiment of the present invention.

FIG. 2 is a flowchart 200 illustrating operational steps for identifying a directional voice command within a plurality of generated mixed reality environments, in accordance with at least one embodiment.

In step 202, the program 104 receives data from at least one user. In this embodiment, the program 104 receives data from at least one user in a plurality of users, wherein the received data comprises a directional voice command. In this embodiment, the program 104 defines data as information from a user that represents a command. In this embodiment, the program 104 receives voice data, video data, image data, and textual data. In this embodiment, the program 104 receives a voice command associated with a performance of a future action. In this embodiment, the program 104 defines a voice command as an instruction transmitted to an artificial intelligence device, and this instruction is associated with the performance of a future action. In another embodiment, the program 104 receives a wake-up command prior to receiving any data from the user. For example, the program 104 receives a voice command to schedule a vacation for the family of the user and coordinate that vacation with the vacation plans of another user. In another example, the program 104 receives a voice command to make a reservation for user A and user B at a restaurant.

In step 204, the program 104 analyzes the received data. In this embodiment, the program 104 analyzes the received data for a contextual factor associated with the user by identifying an identity associated with the user based on the received voice command. In this embodiment, the program 104 identifies an identity associated with the user by analyzing speech patterns and vocal tones associated with the received voice command using a natural linguistic programming algorithm. In this embodiment, the program 104 defines a contextual factor as a factor that provides additional information to the received voice command. In this embodiment, the program 104 analyzes the received data for a request factor by using an artificial intelligence voice assistance algorithm. In this embodiment, the program 104 may receive voice commands when the user is not near the artificial intelligence device by pairing a mobile phone associated with the user to the artificial intelligence device to receive voice commands at any location. In this embodiment, the program 104 may transmit a transcript of the voice command to the paired mobile phone in response to receiving the voice command from the artificial intelligence device. For example, the program 104 analyzes the received voice command to identify the other users needed to complete the future performance, such as the other users associated with the future vacation plans.

In step 206, the program 104 generates a plurality of mixed reality environments based on the analysis of the received data. In this embodiment, the program 104 generates a plurality of mixed reality environments by projecting a plurality of virtual items that are layered over a tangible area outside of a virtual reality environment. In this embodiment, the program 104 defines a virtual item as an item that is digitally created to resemble a tangible item for interaction with the user. For example, the program 104 generates a virtual television within the physical living room of the user. In this embodiment, the program 104 generates the plurality of mixed reality environments that are three-dimensional. In this embodiment, the program 104 generates a plurality of virtual layouts based on multiple blueprints by retrieving digital building plan metrics from a performed query. In this embodiment, the program 104 projects the plurality of virtual items by using a gamification algorithm that allows the user to interact with the generated virtual items within the mixed reality environment. In this embodiment, the program 104 projects a plurality of virtual individuals within the generated mixed reality environment, and each respective projected virtual individual is capable of providing a directional voice command. For example, the program 104 projects four virtual individuals within the generated mixed reality, and two of the virtual individuals request assistance with a spill.

In step 208, the program 104 dynamically generates a plurality of scenarios within the generated mixed reality environments, in accordance with at least one embodiment of the present invention. In this embodiment and within each respective generated mixed reality environment, the program 104 creates the plurality of scenarios based on the analysis of the contextual factors of the directional voice command associated with a generated virtual individual. In this embodiment, the program 104 defines a scenario as a sequence or development of events. In this embodiment, each created scenario may be associated with a different directional voice command. For example, the program 104 creates a plurality of scenarios such as controlling home automation, executing devices, and creating activities. In this embodiment, the program 104 generates multiple scenarios such as a meeting room, conference room, and hospital room. In this embodiment, the program 104 dynamically generates at least one scenario that is three-dimensional. In another embodiment, the program 104 triggers multiple directional voice commands from various distances from the computing devices 102 with a variety of voice frequencies ranging from high to low.

In step 210, the program 104 locates an origin of the directional voice command. In this embodiment and within each of the dynamically generated scenarios, the program 104 identifies a location associated with each directional voice command based on direction and angular position in relation to the computing device 102. For example, the program 104 identifies that a virtual individual is located in a corner of the generated mixed reality environment twelve meters away and three degrees to the right of the computing device 102 based on the received directional voice command to clean a spill. In another embodiment, the program 104 identifies the identity of the individual responsible for the directional voice command by using natural linguistic processing algorithms when the individual is not a generated virtual individual. In another embodiment, the program 104 identifies the virtual object in context with the location of the virtual individual. For example, the program 104 receives a voice command of "clean this," where the virtual individual is standing next to one or more virtual items corresponding to one or more real items. In another embodiment, the program 104 identifies the location associated with the at least one received directional voice command by identifying the location associated with the at least one received directional voice command based on a direction at a predetermined period of time in relation to the computing device; and identifying a location associated with the at least one received directional voice command based on angular position at a predetermined period of time in relation to the computing device.

In step 212, the program 104 validates the location of the directional voice command within the generated mixed reality environment. In this embodiment, the program 104 validates the location of the directional voice command by identifying a deviation (i.e. delta) within the analysis of the directional voice command, testing success, and failure criteria using a corpus knowledge algorithm that continually updates parameters associated with each respective generated scenario within the plurality of scenarios; and transmitting a result of the test to a server computer 108 via a network 106.

In this embodiment, the program 104 identifies a deviation with the directional voice command by comparing each directional voice command associated with each virtual individual and determining an outlier within the plurality of directional voice commands. The program 104 defines the deviation as an amount by which a single contextual factor associated with a directional voice command differs from the remainder of the plurality of contextual factors associated with the plurality of directional voice commands. For example, the program 104 identifies the deviation in directional voice command A as an elevated change in voice frequency and elevated decibel level, which results in a high-pitched scream, from the remainder of directional voice commands within the plurality of directional voice command.

In this embodiment, the program 104 tests success and failure criteria by determining a time associated with identifying the location of the directional voice command for the plurality of generated scenarios. In this embodiment, the program 104 determines that the test is failure based on the time needed to identify the location of the directional voice command meeting or exceeding a predetermined threshold of time. In this embodiment, the program 104 defines the predetermined threshold of time as five seconds and anything that needs more than five seconds to be located is determined as a failure for that given generated scenario. For example, in generated scenario A, the program 104 located the directional voice command within three seconds and the program 104 located the directional voice command associated with generated scenario B in nine seconds. Therefore, the program 104 determines that generated scenario A is a successful test and generated scenario B is a failed test. In this embodiment, the program 104 may need longer to identify the location of the directional voice command based on distance, volume, pitch, and the plurality of contextual factors used in the analysis of the directional voice command. In another embodiment, the predetermined threshold may be adjusted based on a dynamic value associated with a percentage of success and failures. For example, the generated layout of the room requires all test to take over seven second to be performed. In this embodiment, the program 104 dynamically adjusts the predetermined threshold to account for the increase in square footage and the proportional increase in time to perform the analyzed voice command based on the increase in square footage.

In this embodiment, the program 104 transmits the results of the test to the server computer 108 for storage. In this embodiment and in response to determining the result of the test, the program 104 transmits the result as a response to the received plurality of directional voice commands to the computing device 102 associated with the identified user. In this embodiment, the program 104 displays the results within a generated user interface for the computing device 102. For example, the program 104 transmits the results that depict that within a generated scenario, the directional voice command struggled to be located within a specific area of the generated mixed reality environment, specifically the area behind the couch within the living room. This result allows the user to move the computing device 102 to be closer to that area and known areas that are not easily picked up by an artificial intelligence voice device. In another embodiment, the program 104 dynamically performs the analyzed directional voice command based on the result of the test associated with the validation of the directional voice command. In another embodiment and in response to the directional voice command meeting or exceeding the predetermined threshold of time, the program 104 transmits instructions to a computing device to navigate to the verified location of the directional voice command using artificial intelligence algorithms and global positioning system algorithms. For example, the program 104 transmits locations to a smart vacuum cleaning device to dynamically navigate to the location of the virtual individual who requested assistance with cleaning a spill.

Figure 3:
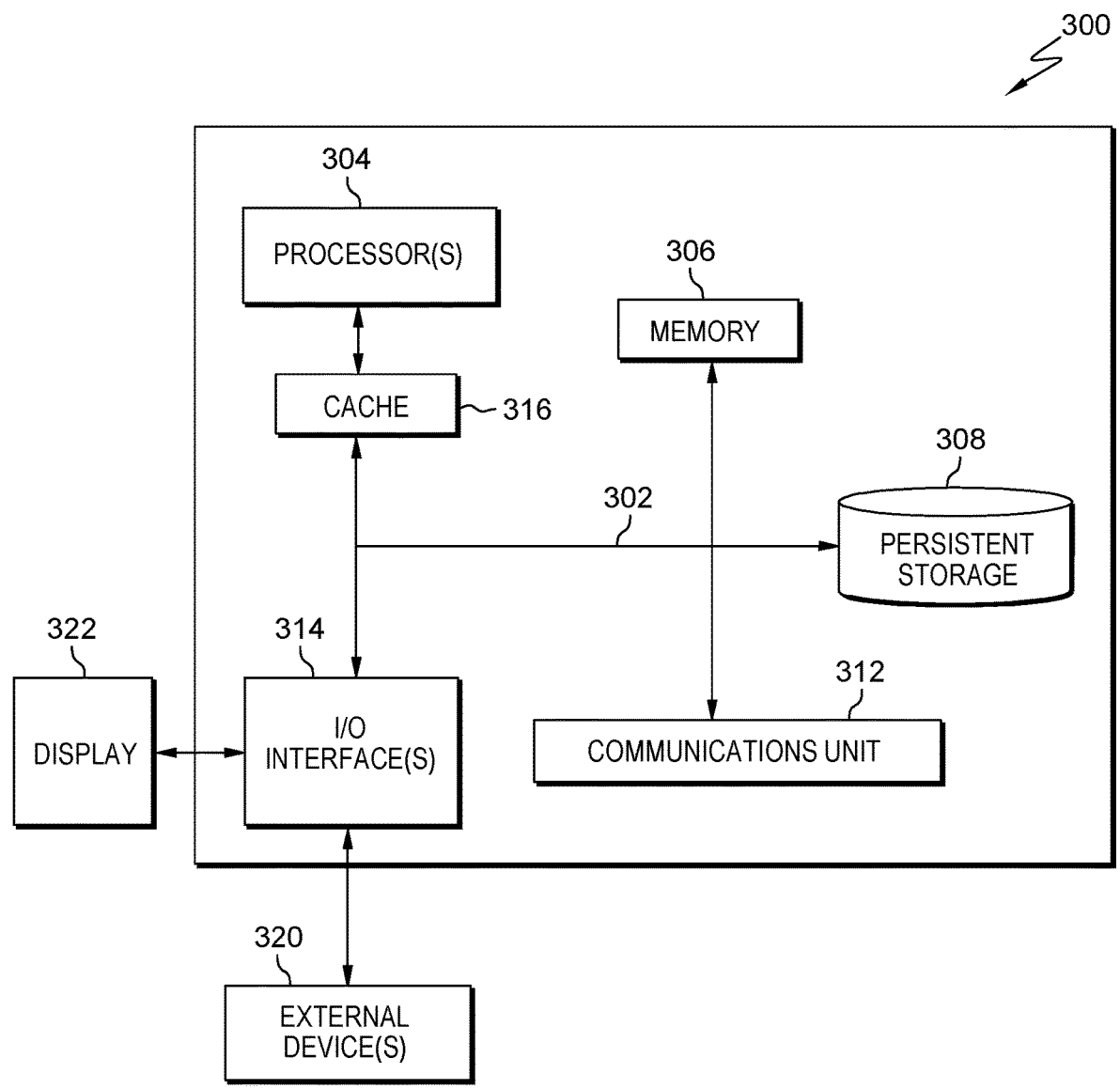
FIG. 3 depicts a block diagram of components of computing systems within a computing display environment of FIG. 1, in accordance with an embodiment of the present invention.

FIG. 3 depicts a block diagram of components of computing systems within a computing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 300 includes a communications fabric 302, which provides communications between a cache 316, a memory 306, a persistent storage 308, a communications unit 312, and an input/output (I/O) interface(s) 314. The communications fabric 302 can be implemented with any architecture designed for passing data and/or control information between processors (such as microprocessors, communications and network processors, etc.), system memory, peripheral devices, and any other hardware components within a system. For example, the communications fabric 302 can be implemented with one or more buses or a crossbar switch.

The memory 306 and the persistent storage 308 are computer readable storage media. In this embodiment, the memory 306 includes random access memory (RAM). In general, the memory 306 can include any suitable volatile or non-volatile computer readable storage media. The cache 316 is a fast memory that enhances the performance of the computer processor(s) 304 by holding recently accessed data, and data near accessed data, from the memory 306.

The program 104 may be stored in the persistent storage 308 and in the memory 306 for execution by one or more of the respective computer processors 304 via the cache 316. In an embodiment, the persistent storage 308 includes a magnetic hard disk drive. Alternatively, or in addition to a magnetic hard disk drive, the persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 308 may also be removable. For example, a removable hard drive may be used for the persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 includes one or more network interface cards. The communications unit 312 may provide communications through the use of either or both physical and wireless communications links. The program 104 may be downloaded to the persistent storage 308 through the communications unit 312.

The I/O interface(s) 314 allows for input and output of data with other devices that may be connected to a mobile device, an approval device, and/or the server computer 108. For example, the I/O interface 314 may provide a connection to external devices 320 such as a keyboard, keypad, a touch screen, and/or some other suitable input device. External devices 320 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 308 via the I/O interface(s) 314. The I/O interface(s) 314 also connect to a display 322.

The display 322 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for identifying directional voice command within a plurality of a mixed reality environment, comprising:

analyzing a received directional voice command by identifying a plurality of contextual factors associated with at least one user in a plurality of users using a natural language processing algorithm, wherein the at least one user is associated with a computing device;

dynamically identifying the at least one user in the plurality of users based on an analysis of the identified contextual factors associated with the analyzed directional voice command;

generating a plurality of scenarios within the mixed reality environment based on the identified contextual factors associated with analyzed directional voice command, wherein both the identified user, incorporated with a plurality of virtual individuals capable of transmitting the analyzed directional voice command, and the mixed reality environment, generated based on projecting a plurality of virtual items, are layered over a tangible area outside of a virtual reality environment;

identifying a location within the generated plurality of scenarios associated with at least one received directional voice command within a plurality of directional voice commands associated with the plurality of virtual individuals;

validating the identified location associated with the at least one received directional voice command using a corpus knowledge algorithm and a global position system algorithm, wherein the corpus knowledge algorithm continually updates parameters associated with the plurality of scenarios; and identifying a deviation within the analysis of the received directional voice command;

testing failure criteria by continually updating a plurality of parameters associated with each respective generated scenario within the plurality of scenarios based on the identified deviation using the corpus knowledge algorithm, wherein the plurality of parameters include time based, distance based, volume based, pitch based parameters and a predetermined threshold.

2. The computer-implemented method of claim 1, wherein the plurality of contextual factors provides additional information to the received directional voice command, wherein the additional information is security information associated with each user within the plurality of users.

3. The computer-implemented method of claim 1, wherein analyzing the received directional voice command comprises determining a request factor within the received directional voice command using an artificial intelligence voice assistance algorithm.

4. The computer-implemented method of claim 1, further comprising dynamically transmitting a transcript associated with the received directional voice command to another computing device associated with a different user.

5. The computer-implemented method of claim 1, further comprising generating the mixed reality environment by projecting a plurality of virtual items that are layered over a physical area outside of a virtual reality environment.

6. The computer-implemented method of claim 1, wherein generating the plurality of scenarios comprises generating a scenario for each sequence of developing events based on the analysis of the received directional voice command associated with each user within the plurality of users.

7. The computer-implemented method of claim 1, wherein identifying the location associated with the at least one received directional voice command comprises:
   identifying a location associated with the at least one received directional voice command based on a direction at a predetermined period of time in relation to the computing device; and
   identifying a location associated with the at least one received directional voice command based on angular position at a predetermined period of time in relation to the computing device.

8. The computer-implemented method of claim 1, wherein validating the identified location comprises:
   identifying the deviation within the analysis of the received directional voice command;
   initiating a test within the plurality of scenarios based on the identified deviation of the analyzed directional voice command; and
   testing success criteria or by continually updating a plurality of parameters associated with each respective generated scenario within the plurality of scenarios based on the identified deviation using the corpus knowledge algorithm.

9. A computer program product comprising:
   one or more computer readable storage media and program instructions stored on the one or more computer readable storage media, the program instructions comprising:
      program instructions to analyze a received directional voice command by identifying a plurality of contextual factors associated with at least one user in a plurality of users using a natural language processing algorithm, wherein the at least one user is associated with a computing device;
      program instructions to dynamically identify the at least one user in the plurality of users based on an analysis of the identified contextual factors associated with the analyzed directional voice command;
      program instructions to generate a plurality of scenarios within a mixed reality environment based on the identified contextual factors associated with analyzed directional voice command, wherein both the identified user, incorporated with a plurality of virtual individuals capable of transmitting the analyzed directional voice command, and the mixed reality environment, generated based on projecting a plurality of virtual items, are layered over a tangible area outside of a virtual reality environment;
      program instructions to identify a location within the generated plurality of scenarios associated with at least one received directional voice command within a plurality of directional voice commands associated with the plurality of virtual individuals;
      program instructions to validate the identified location associated with the at least one received directional voice command using a corpus knowledge algorithm, wherein the corpus knowledge algorithm continually updates parameters associated with the plurality of scenarios; and program instructions to identify a deviation within the analysis of the received directional voice command;
      program instructions to test failure criteria by continually updating a plurality of parameters associated with each respective generated scenario within the plurality of scenarios based on the identified deviation using the corpus knowledge algorithm, wherein the plurality of parameters include time based, distance based, volume based, pitch based parameters and a predetermined threshold.

10. The computer program product of claim 9, wherein the program instructions to analyze the received directional voice command comprise program instructions to determine a request factor within the received directional voice command using an artificial intelligence voice assistance algorithm.

11. The computer program product of claim 9, wherein the program instructions stored on the one or more computer readable storage media further comprise:
   program instructions to dynamically transmit a transcript associated with the received directional voice command to another computing device associated with a different user.

12. The computer program product of claim 9, wherein the program instructions stored on the one or more computer readable storage media further comprise:
   program instructions to generate the mixed reality environment by projecting a plurality of virtual items that are layered over a physical area outside of a virtual reality environment.

13. The computer program product of claim 9, wherein the program instructions to generate the plurality of scenarios comprise program instructions to generate a scenario for each sequence of developing events based on the analysis of the received directional voice command associated with each user within the plurality of users.

14. The computer program product of claim 9, wherein the program instructions to identify the location associated with the at least one received directional voice command comprise:
  program instructions to identify a location associated with the at least one received directional voice command based on a direction at a predetermined period of time in relation to the computing device; and
  program instructions to identify a location associated with the at least one received directional voice command based on angular position at a predetermined period of time in relation to the computing device.

15. The computer program product of claim 9, wherein the program instructions to validate the identified location comprise:
  program instructions to identify the deviation within the analysis of the received directional voice command;
  program instructions to initiate a test within the plurality of scenarios based on the identified deviation of the analyzed directional voice command; and
  program instructions to test success criteria by continually updating a plurality of parameters associated with each respective generated scenario within the plurality of scenarios based on the identified deviation using the corpus knowledge algorithm.

16. A computer system comprising:
  one or more computer processors;
  one or more computer readable storage media; and
  program instructions stored on the one or more computer readable storage media for execution by at least one of the one or more processors, the program instructions comprising:
    program instructions to analyze a received directional voice command by identifying a plurality of contextual factors associated with at least one user in a plurality of users using a natural language processing algorithm, wherein the at least one user is associated with a computing device;
    program instructions to dynamically identify the at least one user in the plurality of users based on an analysis of the identified contextual factors associated with the analyzed directional voice command;
    program instructions to generate a plurality of scenarios within a mixed reality environment based on the identified contextual factors associated with analyzed directional voice command, wherein both the identified user, incorporated with a plurality of virtual individuals capable of transmitting the analyzed directional voice command, and the mixed reality environment, generated based on projecting a plurality of virtual items, are layered over a tangible area outside of a virtual reality environment;
    program instructions to identify a location within the generated plurality of scenarios associated with at least one received directional voice command within a plurality of directional voice commands associated with the plurality of virtual individuals;
    program instructions to validate the identified location associated with the at least one received directional voice command using a corpus knowledge algorithm, wherein the corpus knowledge algorithm continually updates parameters associated with the plurality of scenarios; and program instructions to identify a deviation within the analysis of the received directional voice command;
    program instructions to test failure criteria by continually updating a plurality of parameters associated with each respective generated scenario within the plurality of scenarios based on the identified deviation using the corpus knowledge algorithm, wherein the plurality of parameters include time based, distance based, volume based, pitch based parameters and a predetermined threshold.

17. The computer system of claim 16, wherein the program instructions to analyze the received directional voice command comprise program instructions to determine a request factor within the received directional voice command using an artificial intelligence voice assistance algorithm.

18. The computer system of claim 16, wherein the program instructions stored on the one or more computer readable storage media further comprise:
  program instructions to dynamically transmit a transcript associated with the received directional voice command to another computing device associated with a different user.

19. The computer system of claim 16, wherein the program instructions to generate the plurality of scenarios comprise program instructions to generate a scenario for each sequence of developing events based on the analysis of the received directional voice command associated with each user within the plurality of users.

20. The computer system of claim 16, wherein the program instructions to identify the location associated with the at least one received directional voice command comprise:
  program instructions to identify a location associated with the at least one received directional voice command based on a direction at a predetermined period of time in relation to the computing device; and
  program instructions to identify a location associated with the at least one received directional voice command based on angular position at a predetermined period of time in relation to the computing device.

* * * * *